(12) United States Patent
Yang et al.

(10) Patent No.: US 11,849,905 B2
(45) Date of Patent: Dec. 26, 2023

(54) FLAT SEPARATOR AND CLEANER

(71) Applicant: SUZHOU GAMANA ELECTRIC APPLIANCE CO., LTD., Jiangsu (CN)

(72) Inventors: Zengzheng Yang, Jiangsu (CN); Ming Liu, Jiangsu (CN)

(73) Assignee: SUZHOU GAMANA ELECTRIC APPLIANCE CO., LTD., Suzhou (CN)

(*) Notice: Subject to any disclaimer, the term of this patent is extended or adjusted under 35 U.S.C. 154(b) by 217 days.

(21) Appl. No.: 17/415,709

(22) PCT Filed: Dec. 17, 2018

(86) PCT No.: PCT/CN2018/121611
§ 371 (c)(1),
(2) Date: Jun. 17, 2021

(87) PCT Pub. No.: WO2020/124333
PCT Pub. Date: Jun. 25, 2020

(65) Prior Publication Data
US 2022/0053987 A1     Feb. 24, 2022

(51) Int. Cl.
*B01D 45/14*     (2006.01)
*A47L 9/16*      (2006.01)

(52) U.S. Cl.
CPC ............ *A47L 9/1683* (2013.01); *B01D 45/14* (2013.01)

(58) Field of Classification Search
CPC ........ A47L 9/1683; A47L 9/102; B01D 45/14
See application file for complete search history.

(56) References Cited

U.S. PATENT DOCUMENTS

| 4,229,194 A | * | 10/1980 | Baillie | B01D 45/12 55/435 |
| 4,361,490 A | * | 11/1982 | Saget | B04B 5/12 210/512.3 |
| 6,110,246 A | * | 8/2000 | Eubank | B01D 45/14 55/394 |

(Continued)

FOREIGN PATENT DOCUMENTS

| CN | 202235170 U | 5/2012 |
| CN | 107898383 A | 4/2018 |
| CN | 207412114 U | 5/2018 |

OTHER PUBLICATIONS

International Search Report of PCT Patent Application No. PCT/CN2018/121611 dated Sep. 9, 2019.

*Primary Examiner* — Dung H Bui (57) ABSTRACT

The present invention discloses a flat separator. The separator includes a circular base and a plurality of airflow guiding portions, where the airflow guiding portions protrude from or concave with respect to a surface of the circular base, and are evenly distributed along a circumferential direction of the circular base, and the airflow guiding portion is provided with a shell-type airflow guiding channel running through the circular base. The present invention further discloses a cleaner with the separator. The separator is disposed on the top of a dust cup. According to the present invention, a structure of a separation body is changed. This improves dedusting efficiency, realizes air-liquid separation, and avoids entwining by garbage.

14 Claims, 5 Drawing Sheets

(56) References Cited

U.S. PATENT DOCUMENTS

| | | | |
|---|---|---|---|
| 7,410,517 B2* | 8/2008 | Han | A47L 9/1666 55/343 |
| 7,462,212 B2* | 12/2008 | Han | B04C 5/26 55/346 |
| 7,510,172 B2* | 3/2009 | Kojima | B01F 25/43141 96/326 |
| 9,879,692 B2* | 1/2018 | Loderer | B01D 45/08 |
| 10,427,172 B2* | 10/2019 | Altorf | B01D 45/16 |
| 2005/0172584 A1* | 8/2005 | Oh | A47L 9/1641 55/345 |
| 2005/0252180 A1* | 11/2005 | Oh | A47L 9/1683 55/345 |
| 2006/0150587 A1* | 7/2006 | Hong | B04C 5/28 55/343 |
| 2006/0230721 A1* | 10/2006 | Oh | A47L 9/1625 55/345 |
| 2006/0254226 A1* | 11/2006 | Jeon | B04C 5/24 55/345 |
| 2008/0184681 A1* | 8/2008 | Oh | A47L 9/1641 55/345 |
| 2008/0264017 A1* | 10/2008 | Oh | B04C 5/185 55/461 |
| 2015/0125351 A1* | 5/2015 | Fedorov | B01J 19/2405 366/173.1 |

* cited by examiner

FLAT SEPARATOR AND CLEANER

TECHNICAL FIELD

The present invention relates to a separator, and in particular, to a separator used for a cleaner, and further relates to a cleaner with the separator.

BACKGROUND

At present, cleaners have been common electrical devices in thousands of families. A bag filter, a single-cone filter, and a tornado system are mainly used as filtering systems of traditional cleaners. The bag filter can perform filtering only by relying on a filter bag. When pores of filter material of the filter bag are covered with particulates or garbage, the bag filter can no longer perform dust collection normally. The principle of the single-cone filter is that dust-laden air enters a dust cup to form a rotating air passage, and large garbage is thrown away through a circular motion to separate dust from the air. An air-dust separation effect of the single-cone filter is generally poor. The principle of the tornado system is that dust-laden air enters several parallel filtering cones and makes circular motion inside the cones. Most garbage and dust fall into a dust cup from an outlet at a lower end of the cone along a cone wall in the circular motion, while dedusted air enters a motor from an upper end. However, an air-dust separation effect of the tornado system is generally poor and is only slightly better than that of the single-cone filter. These cleaners have a few filtering layers, resulting in a poor cleaning effect, and they cannot separate liquid.

Some new cleaners have corresponding separators and can realize air-dust and air-liquid separation. The separator is disposed in a dust cup of the cleaner. When the cleaner is working, airflow in the dust cup is mixed with a large amount of particulate garbage that can easily hit a separation body which rotates at a high speed. In addition, an outer side of the separation body is usually covered with a grid, and the grid will be entwined by garbage such as hair and cotton when the separation body rotates. A separation effect is lowered in case of entwining, and the service life of the whole system is affected. For another kind of separation body designed to protrude downward from the top of the dust cup, entwining by garbage may easily occur due to high-speed rotation of the separation body, resulting in various problems. Therefore, it is necessary to improve the design of the existing separator.

SUMMARY

To resolve the above technical problem, the present invention provides a flat separator. The separator includes a circular base and a plurality of airflow guiding portions.

The airflow guiding portions protrude from or concave with respect to a surface of the base, and are evenly distributed along a circumferential direction of the base, and the airflow guiding portion is provided with a shell-type airflow guiding channel running through the circular base.

Further, a side of the airflow guiding portion facing an edge of the base is an arc, a straight line, or a broken line.

Further, the airflow guiding portion includes a first contour segment, a second contour segment, a third contour segment, and a fourth contour segment; and the first contour segment, the second contour segment, the third contour segment, and the fourth contour segment are successively connected to constitute the outer contour of the airflow guiding portion projected on the surface of the base.

Further, the first contour segment and the third contour segment are oppositely disposed, the first contour segment faces the edge of the base, and the third contour segment faces a center of the base; and the second contour segment and the fourth contour segment are oppositely disposed, and the second contour segment and the fourth contour segment face two adjacent airflow guiding portions respectively.

Further, the first contour segment is an outward-protruded or inward-concaved arc, the third contour segment is an inward-concaved arc, the second contour segment is a straight line, and the fourth contour segment is a circular arc.

Further, the base includes a first surface and a second surface that are opposite to each other, and a depth of the airflow guiding portion protruding from or concaving with respect to the first surface decreases from one end to the other end.

Further, the separator further includes a ring-shaped connecting plate, one end of the ring-shaped connecting plate is disposed at an edge of the second surface, and an edge of the other end of the ring-shaped connecting plate is provided with a flange.

Further, the separator further includes a shaft coupling portion, a center of the shaft coupling portion is provided with a fixing hole, and the fixing hole is provided with a locking piece.

Further, the separator further includes a reinforcing structure, and the reinforcing structure includes a reinforcing ring and several reinforcing ribs;

the reinforcing ring is disposed around an outer side of the shaft coupling portion and is connected to the first surface; and the several reinforcing ribs are evenly disposed between the reinforcing ring and the shaft coupling portion.

Preferably, the number of airflow guiding portions is odd.

Correspondingly, the present invention further provides a cleaner, wherein the cleaner includes a dust cup and the above-mentioned flat separator, and the separator is disposed on the top of the dust cup.

The implementation of the Embodiments of the present invention has the following beneficial effects:

(1) The separator provided in the present invention removes a grid structure of the traditional separator to facilitate cleaning and realize air-dust and air-liquid separation.

(2) In addition, the separator is a flat structure, and cannot be entwined by garbage in the dust cup, thereby ensuring its service performance and prolonging its service life.

(3) The separator is disposed on the top of the dust cup, and this can prevent air-dust or air-liquid from hitting the separator that rotates at a high speed, thereby greatly reducing the probability of damage of the separator.

BRIEF DESCRIPTION OF THE DRAWINGS

To describe the technical solutions and advantages in the embodiments of the present invention or in the prior art more clearly, the following briefly describes the accompanying drawings required for describing the embodiments or the prior art. Apparently, the accompanying drawings in the following description only show some embodiments of the present invention, and a person of ordinary skill in the art

Reference numerals in the accompanying drawings: 1: base; 101: first surface; 102: second surface; 2: airflow guiding portion; 201: first contour segment; 202: second contour segment; 203: third contour segment; 204: fourth contour segment; 205: depth contour; 206: fifth contour segment; 207: sixth contour segment; 208: seventh contour segment; 3: ring-shaped connecting plate; 4: flange; 5: shaft coupling portion; 501: fixing hole; 502: locking piece; 6: reinforcing ring; 7: reinforcing rib; A: separator; and B: dust cup.

DETAILED DESCRIPTION

In order to make the objectives, technical solutions, and advantages of the present invention clearer, the present invention will be further described in detail with reference to the accompanying drawings. Apparently, the described embodiments are merely a part rather than all of the embodiments of the present invention. All other embodiments obtained by a person of ordinary skill in the art based on the embodiments of the present invention without inventive efforts fall within the protection scope of the present invention.

The "an embodiment" or "embodiment" herein refers to a particular feature, structure, or characteristic that may be included in at least one implementation of the present invention. In the description of the present invention, it should be understood that orientation or position relationships indicated by terms "upper", "lower", "left", "right", and the like are orientation or position relationships as shown in the drawings, and these terms are just used to facilitate description of the present invention and simplify the description, but not to indicate or imply that the mentioned apparatus or elements must have a specific orientation and must be constructed and operated in a specific orientation, and thus, these terms cannot be understood as a limitation to the present invention. Moreover, the terms "first" and "second" are used only for the purpose of description and should not be construed as indicating or implying relative importance or implicitly indicating a quantity of indicated technical features. Thus, features defined with "first" and "second" may explicitly or implicitly include one or more of the features. Further, the terms such as "first" and "second" are intended to distinguish between similar objects, rather than to necessarily describe or indicate a specific order or sequence. It should be understood that the objects used in such a way may be exchanged under proper conditions to make it possible to implement the described embodiments of the present invention in other sequences apart from those illustrated or described herein.

In addition, unless otherwise clearly specified and limited, the terms "interconnection", "connection", and the like are intended to be interpreted broadly. For example, the "connection" may be a fixed connection, a removable connection, or an integral connection; may be a mechanical connection or an electrical connection; may be a direct connection or an indirect connection using a medium; may be a connection or an interaction relationship between two elements. A person of ordinary skill in the art may understand specific meanings of the foregoing terms in the present invention based on a specific situation.

Embodiment 1

As shown in FIG. 1 to FIG. 4, this embodiment provides a flat separator. The separator includes a circular base 1 and a plurality of airflow guiding portions 2. The airflow guiding portions 2 protrude from a surface of the base 1, and are evenly distributed along a circumferential direction of the base 1, and the airflow guiding portion 2 is provided with a shell-type airflow guiding channel running through the circular base 1.

Further, a side of the airflow guiding portion 2 facing an edge of the base 1 is an arc, a straight line, or a broken line.

Figure 2:
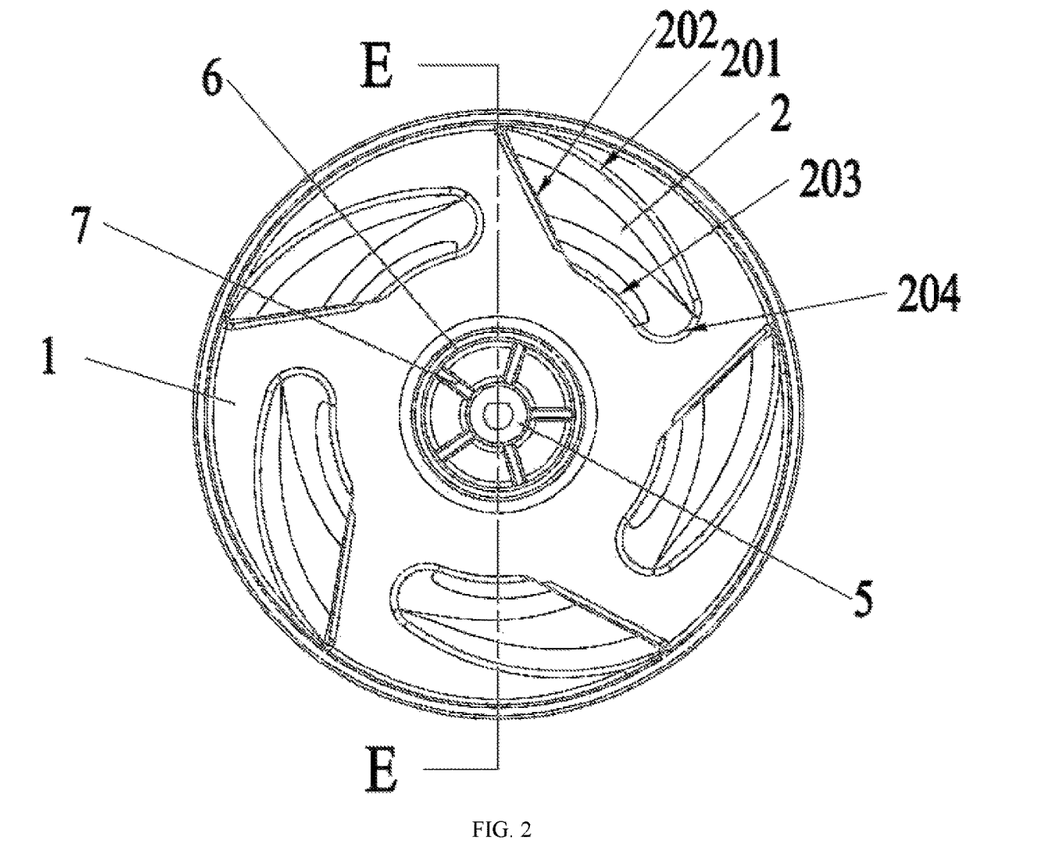
FIG. 2 shows a viewpoint of the separator according to Embodiment 1 of the present invention.

Specifically, as shown in FIG. 2, there are five airflow guiding portions 2 that evenly surround a circumferential edge of the circular base 1.

Preferably, the airflow guiding portion is similar to an airfoil, and includes a first contour segment 201, a second contour segment 202, a third contour segment 203, and a fourth contour segment 204; and the first contour segment 201, the second contour segment 202, the third contour segment 203, and the fourth contour segment 204 are successively connected to constitute the outer contour of the airflow guiding portion projected on the surface of the base 1.

Further, the first contour segment 201 and the third contour segment 203 are oppositely disposed, the first contour segment 201 faces the edge of the base 1, and the third contour segment 203 faces a center of the base 1; and the second contour segment 202 and the fourth contour segment 204 are oppositely disposed, and the second contour segment 202 and the fourth contour segment 204 face two adjacent airflow guiding portions respectively.

Further, the first contour segment 201 is an outward-protruded arc, the third contour segment is an inward-concaved arc, the second contour segment 202 is a straight line, and the fourth contour segment is a circular arc.

Further, the first contour segment 201 may alternatively be an inward-concaved arc.

Further, the first contour segment 201 gradually approaches the outer edge of the base 1 from the inner side of the base 1.

Further, for two adjacent airflow guiding portions, the second contour segment 202 of one airflow guiding portion is opposite to the fourth contour section 204 of the other airflow guiding portion.

Figure 3:
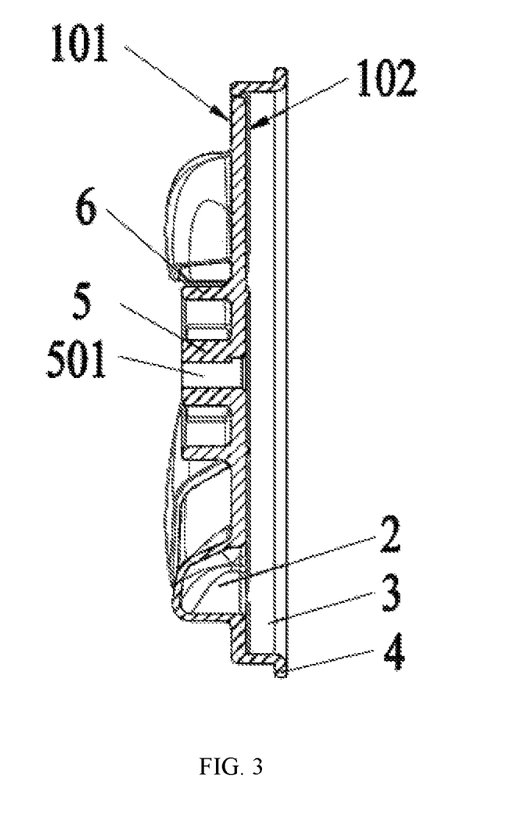
FIG. 3 is a sectional view of E-E in FIG. 2.

Further, the base 1 includes a first surface 101 and a second surface 102 that are opposite to each other.

Further, a depth of the airflow guiding portion 2 protruding from or concaving with respect to the first surface 101 decreases from one end to the other end.

Figure 4:
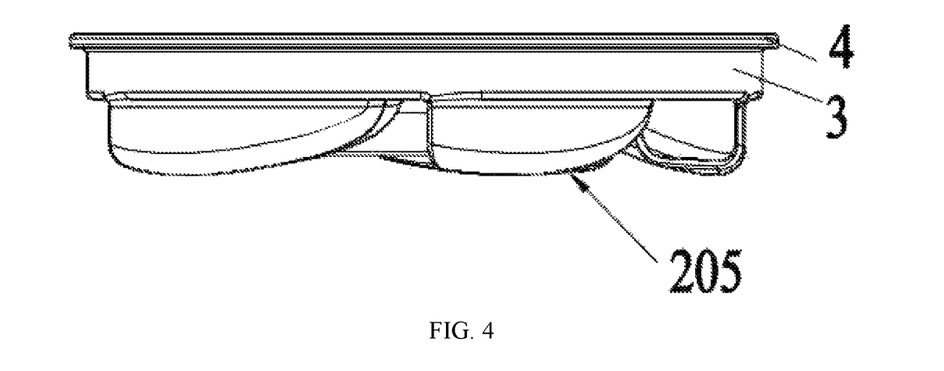
FIG. 4 shows another viewpoint of the separator according to Embodiment 1 of the present invention.

Specifically, as shown in FIG. 4, from the fourth contour segment 204 to a junction between the first contour segment 201 and the second contour segment 202, the depth of the airflow guiding portion 2 protruding from the first surface 101 has a decreasing trend.

Preferably, a depth contour 205 of the airflow guiding portion 2 protruding from the first surface 101 is an arc.

Further, the separator further includes a ring-shaped connecting plate 3, one end of the ring-shaped connecting plate 3 is disposed at an edge of the second surface 102, and an edge of the other end of the ring-shaped connecting plate 3 is provided with a flange 4.

Figure 1:
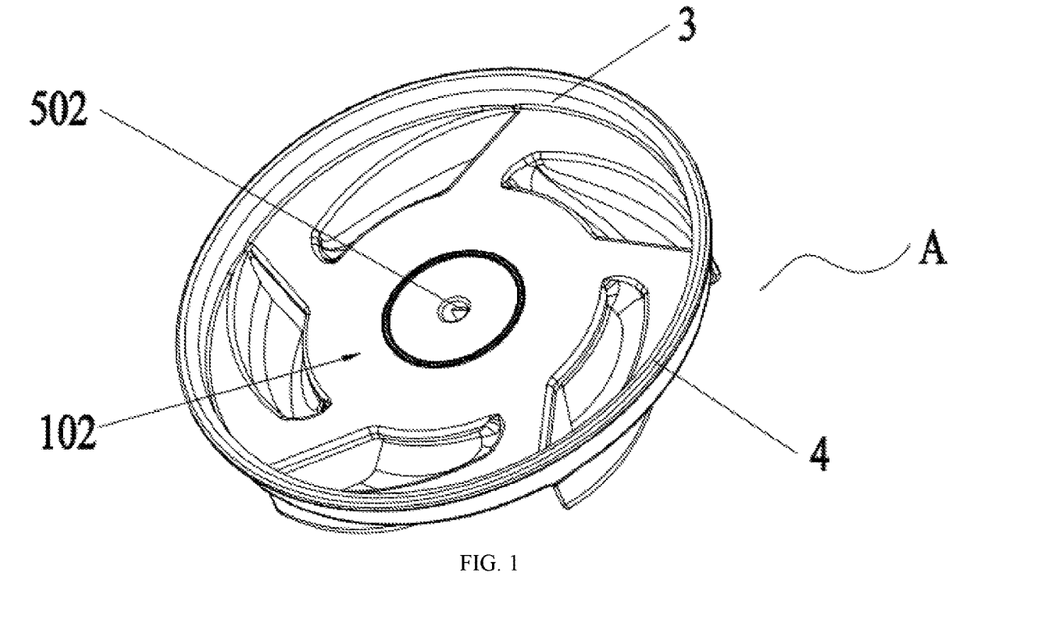
FIG. 1 is a perspective view of a separator according to Embodiment 1 of the present invention.

Further, the separator further includes a shaft coupling portion 5, and the shaft coupling portion 5 is a cylinder and is disposed in the center of the base 1.

Further, a center of the shaft coupling portion 5 is provided with a fixing hole 501. As shown in FIG. 1, the fixing hole 501 is provided with a locking piece 502. The separator needs to be connected to a motor and rotates with the motor. The locking piece 502 can prevent relative rotation of the separator when the separator is connected to a connecting piece.

Further, the separator further includes a reinforcing structure, and the reinforcing structure includes a reinforcing ring 6 and several reinforcing ribs 7;
  the reinforcing ring 6 is disposed around the outer side of the shaft coupling portion 5 and is connected to the first surface 101; and
  the several reinforcing ribs 7 are evenly disposed between the reinforcing ring 6 and the shaft coupling portion 5.

Preferably, the number of airflow guiding portions 2 is odd.

Figure 6:
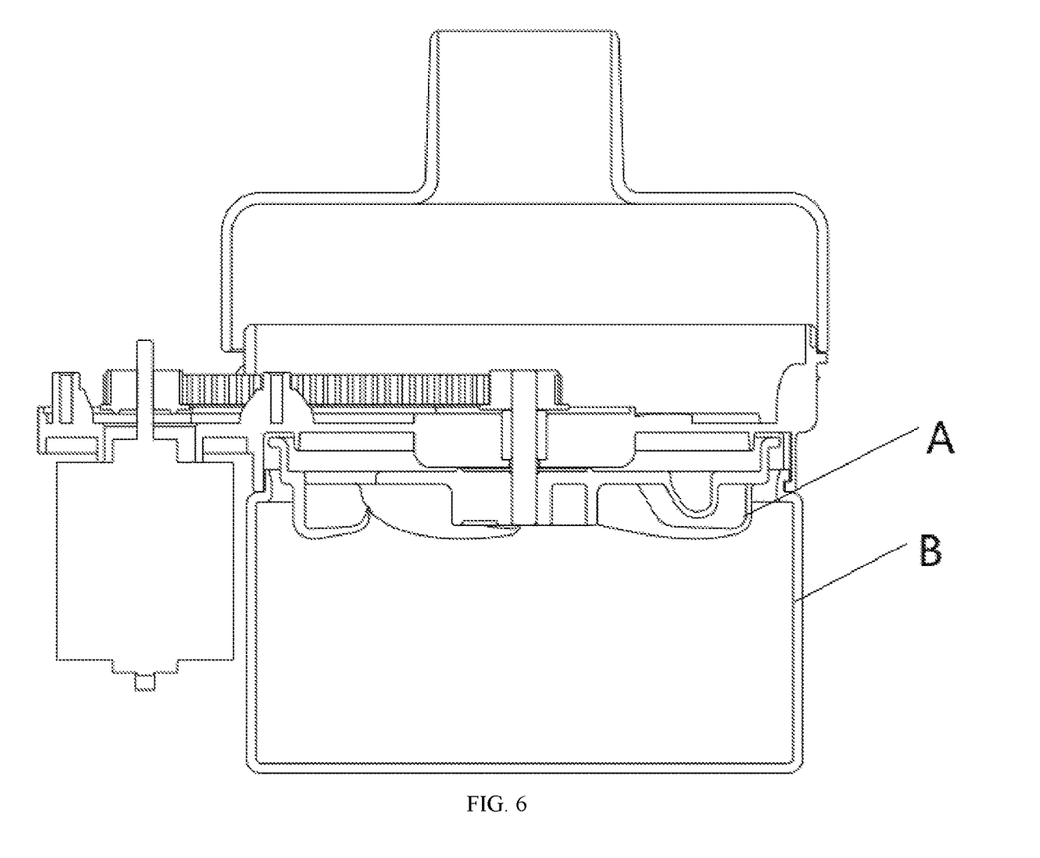
FIG. 6 is a local diagram of a cleaner according to Embodiment 1 of the present invention.

Correspondingly, as shown in FIG. 6, this embodiment further provides a cleaner. The cleaner includes a dust cup B and the above-mentioned flat separator A, and the separator A is disposed on the top of the dust cup B.

When the cleaner is working, the separator A rotates under the action of a driving apparatus to enable air in the dust cup B to rotate, to separate inhaled dust and/or liquid.

Embodiment 2

Figure 5:
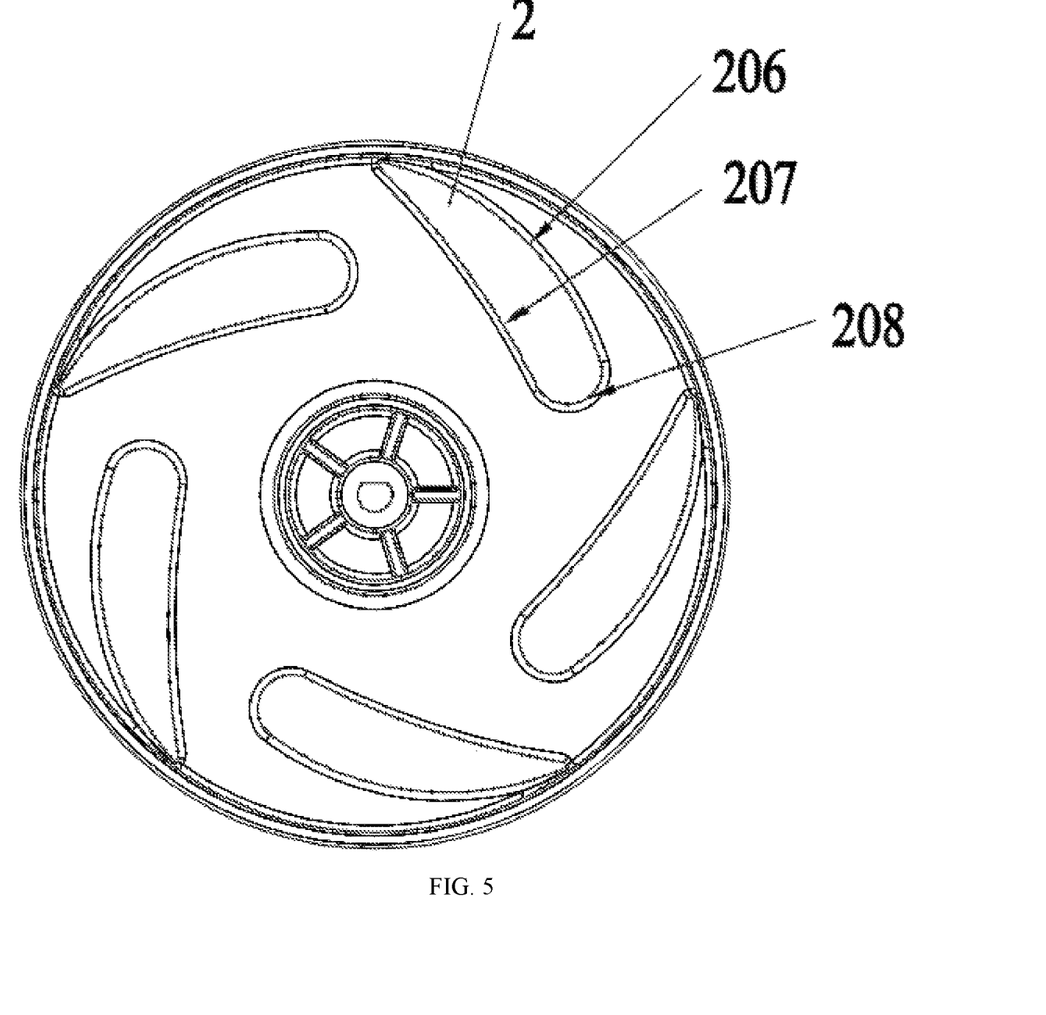
FIG. 5 shows a viewpoint of a separator according to Embodiment 2 of the present invention.

As shown in FIG. 5, this embodiment provides a flat separator. The separator includes a circular base 1 and a plurality of airflow guiding portions 2.

The airflow guiding portions 2 protrude from a surface of the circular base 1, and are evenly distributed along a circumferential direction of the circular base 1, and the airflow guiding portion 2 is provided with a shell-type airflow guiding channel running through the circular base 1.

Further, a side of the airflow guiding portion 2 facing an edge of the circular base 1 is an arc, a straight line, or a broken line.

Specifically, there are five airflow guiding portions 2 that evenly surround a circumferential edge of the circular base 1.

Preferably, the airflow guiding portion is an airfoil, and includes a fifth contour segment 206, a sixth contour segment 207, and a seventh contour segment 208; and
  the fifth contour segment 206, the sixth contour segment 207, the seventh contour segment 208, and the fourth contour segment 204 are successively connected to constitute the outer contour of the airflow guiding portion projected on the surface of the circular base 1.

Further, the fifth contour segment 206 faces the edge of the circular base 1, and the sixth contour segment 207 faces a center of the circular base 1.

Further, the fifth contour segment 206 is an outward-protruded arc, the sixth contour segment 207 is an inward-concaved arc, and the seventh contour segment 208 is semicircular.

Further, the fifth contour segment 206 may alternatively be an inward-concaved arc.

Further, the fifth contour segment 206 gradually approaches an outer edge of the circular base 1 from an inner side of the circular base 1.

Further, for two adjacent airflow guiding portions, the sixth contour segment 207 of one airflow guiding portion is opposite to the seventh contour section 208 of the other airflow guiding portion.

Further, the circular base 1 includes a first surface 101 and a second surface 102 that are opposite to each other.

Further, the airflow guiding portion 2 sinks from the second surface 102 to the first surface 101 and protrudes from the first surface 101. As shown in the figure, the airflow guiding portion 2 is of a groove-shaped structure.

Further, a depth of the airflow guiding portion 2 protruding from or concaving with respect to the first surface 101 has a decreasing trend from one end to the other end.

Further, the separator further includes a ring-shaped connecting plate 3, one end of the ring-shaped connecting plate 3 is disposed at an edge of the second surface 102, and an edge of the other end of the ring-shaped connecting plate 3 is provided with a flange 4.

Further, the separator further includes a shaft coupling portion 5, and the shaft coupling portion 5 is a cylinder, and is disposed in the center of the circular base 1.

Further, a center of the shaft coupling portion 5 is provided with a fixing hole 501, and the fixing hole 501 is provided with a locking piece 502. The separator needs to be connected to a motor and rotates with the motor. The locking piece 502 can prevent relative rotation of the separator when the separator is connected to a connecting piece.

Further, the separator further includes a reinforcing structure, and the reinforcing structure includes a reinforcing ring 6 and several reinforcing ribs 7;
  the reinforcing ring 6 is disposed around an outer side of the shaft coupling portion 5 and is connected to the first surface 101; and
  the several reinforcing ribs 7 are evenly disposed between the reinforcing ring 6 and the shaft coupling portion 5.

Preferably, the number of airflow guiding portions 2 is odd.

Correspondingly, this embodiment further provides a cleaner. The cleaner includes a dust cup B and the above-mentioned flat separator A, and the separator A is disposed on the top of the dust cup B.

When the cleaner is working, the separator A rotates under the action of a driving apparatus to enable air in the dust cup B to rotate, to separate inhaled dust and/or liquid.

Embodiment 3

This embodiment provides a flat separator. A difference between the separator and the separators in Embodiment 1 and Embodiment 2 is that the airflow guiding portion 2 concaves with respect to the surface of the circular base 1.

Correspondingly, this embodiment further provides a cleaner. The cleaner includes a dust cup B and the above-mentioned flat separator A, and the separator A is disposed on the top of the dust cup B.

Two different airflow guiding portion structures are described above. It should be noted that the above descriptions are merely preferred implementations of the present invention, and a person of ordinary skill in the art may further obtain airflow guiding portion structures in other shapes by making several improvements and modifications without departing from the principle of the present invention, but such improvements and modifications also should be deemed as falling within the protection scope of the present invention.

What is claimed is:

1. A flat separator, wherein the separator (A) comprises a circular base (1) and a plurality of airflow guiding portions (2);
   the airflow guiding portions (2) protrude from or concave with respect to a surface of the circular base (1), and are evenly distributed along a circumferential direction of the circular base (1), and the airflow guiding portion (2) is provided with a shell-type airflow guiding channel running through the circular base (1); and
   wherein the separator (A) further comprises a shaft coupling portion (5), a center of the shaft coupling portion (5) is provided with a fixing hole (501), and the fixing hole (501) is provided with a locking piece (502);
   wherein the circular base (1) comprises a first surface (101) and a second surface (102) that are opposite to each other; and
   a depth of the airflow guiding portion (2) protruding from or concaving with respect to the first surface (101) has a decreasing trend from one end to the other end.

2. The flat separator according to claim 1, wherein a side of the airflow guiding portion (2) facing an edge of the circular base (1) is an arc, a straight line, or a broken line.

3. A cleaner, wherein the cleaner comprises a dust cup (B) and the flat separator according to claim 2, and the separator (A) is disposed on the top of the dust cup (B).

4. A cleaner, wherein the cleaner comprises a dust cup (B) and the flat separator according to claim 1, and the separator (A) is disposed on the top of the dust cup (B).

5. The flat separator according to claim 1, wherein the separator (A) further comprises a ring-shaped connecting plate (3), one end of the ring-shaped connecting plate (3) is disposed at an edge of the second surface (102), and an edge of the other end of the ring-shaped connecting plate (3) is provided with a flange (4).

6. A cleaner, wherein the cleaner comprises a dust cup (B) and the flat separator according to claim 5, and the separator (A) is disposed on the top of the dust cup (B).

7. The flat separator according to claim 1, wherein the separator (A) further comprises a reinforcing structure, and the reinforcing structure comprises a reinforcing ring (6) and several reinforcing ribs (7);
   the reinforcing ring (6) is disposed around an outer side of the shaft coupling portion (5) and is connected to the first surface (101); and
   the several reinforcing ribs (7) are evenly disposed between the reinforcing ring (6) and the shaft coupling portion (5).

8. A cleaner, wherein the cleaner comprises a dust cup (B) and the flat separator according to claim 7, and the separator (A) is disposed on the top of the dust cup (B).

9. The flat separator according to claim 1, wherein the number of airflow guiding portions (2) is odd.

10. A cleaner, wherein the cleaner comprises a dust cup (B) and the flat separator according to claim 9, and the separator (A) is disposed on the top of the dust cup (B).

11. The flat separator according to claim 1, wherein the airflow guiding portion (2) comprises a first contour segment (201), a second contour segment (202), a third contour segment (203), and a fourth contour segment (204); and
   the first contour segment (201), the second contour segment (202), the third contour segment (203), and the fourth contour segment (204) are successively connected to constitute the outer contour of the airflow guiding portion (2) projected on the surface of the circular base (1).

12. The flat separator according to claim 11, wherein the first contour segment (201) and the third contour segment (203) are oppositely disposed, the first contour segment (201) faces the edge of the circular base (1), and the third contour segment (203) faces a center of the circular base (1); and
   the second contour segment (202) and the fourth contour segment (204) are oppositely disposed, and the second contour segment (202) and the fourth contour segment (204) face two adjacent airflow guiding portions (2) respectively.

13. A cleaner, wherein the cleaner comprises a dust cup (B) and the flat separator according to claim 12, and the separator (A) is disposed on the top of the dust cup (B).

14. A cleaner, wherein the cleaner comprises a dust cup (B) and the flat separator according to claim 11, and the separator (A) is disposed on the top of the dust cup (B).

* * * * *